(12) United States Patent
Lorenzoni et al.

(10) Patent No.: US 7,520,209 B2
(45) Date of Patent: Apr. 21, 2009

(54) SERVO FOR A GEAR CHANGE

(75) Inventors: Marcello Lorenzoni, Bologna (IT);
Nerio Mengoli, Casalecchio Di Reno (IT); Stefano Giorgini, Minerbio (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 250 days.

(21) Appl. No.: 11/707,666

(22) Filed: Feb. 16, 2007

(65) Prior Publication Data

US 2007/0266820 A1    Nov. 22, 2007

(30) Foreign Application Priority Data

Feb. 17, 2006   (EP) .................................. 06425098

(51) Int. Cl.
*F16H 59/02* (2006.01)
*F16H 63/08* (2006.01)
(52) U.S. Cl. ........................................ 92/31; 74/337.5
(58) Field of Classification Search ............... 92/31, 92/33; 74/55, 337.5; 477/117
See application file for complete search history.

(56) References Cited

U.S. PATENT DOCUMENTS 5,809,836 A *  9/1998  Patzold et al. .............. 74/337.5
6,729,200 B2 * 5/2004  Paetzold .................... 74/337.5

FOREIGN PATENT DOCUMENTS

DE           100 33 807 A1    2/2002

* cited by examiner

*Primary Examiner*—Thomas E Lazo
(74) *Attorney, Agent, or Firm*—Kenneth L. Sherman, Esq.; Myers Andras Sherman LLP

(57) ABSTRACT

Described herein is a servo for a gear change provided with a control shaft; the servo has: a first actuator, which displaces the control shaft axially along a central axis thereof and is directly coupled to the control shaft; and a second actuator, which renders a cam engaged by a pin projecting from the control shaft angularly fixed to a fixed frame to cause rotation of the control shaft about its central axis during the axial displacement; a cylindrical tubular element is provided, which is coaxial to the control shaft, receives inside it an end portion of the control shaft, supports the cam, and is pushed axially by the second actuator against the fixed frame.

10 Claims, 3 Drawing Sheets

SERVO FOR A GEAR CHANGE

BACKGROUND OF THE INVENTION

There is an increasingly widespread use of servo-assisted gear changes, which are structurally similar to a manual gear change of a traditional type but for the fact that the clutch pedal and the gear lever operated by the driver are replaced by corresponding electrical or hydraulic servos. Using a manual servo-assisted gear change, the driver only has to issue the order to pass to a higher gear or else to a lower gear to a transmission control unit, and the transmission control unit autonomously carries out gear change by acting both on the engine and on the servos associated to the clutch and gear change.

An order for change of gear can be generated manually, i.e., following upon a command imparted by the driver, or else automatically, i.e., independently of the action of the driver. When the order for performing a change of gear is generated, the transmission control unit drives the clutch servo for opening the clutch so as to separate a primary shaft of the gear change mechanically from an engine shaft. At the same time, the transmission control unit acts on the engine control unit in order to reduce temporarily the driving torque supplied by the engine.

Once the transmission control unit has verified opening of the clutch, it drives the gear-change servo to disengage the gear currently engaged. When the transmission control unit has verified disengagement of the gear, it drives the gear-change servo for displacing the gear-change control shaft so as to enable engagement of the new gear. Once the transmission control unit has verified that the gear-change control shaft has reached the desired position, it drives the gear-change servo for engaging the new gear.

Finally, when the transmission control unit has verified engagement of the new gear, it drives the clutch servo for closing the clutch so as to render the primary shaft of the gear change and the engine shaft angularly fixed to one another. At the same time, the transmission control unit acts on the engine control unit for restoring the driving torque supplied by the engine.

Generally, the gear-change servo is of a hydraulic type and acts on a gear-change control shaft to impress on the control shaft both an axial displacement, i.e., along a central axis, for selecting the range of the gears, and a rotation about the central axis for engaging and disengaging the individual gears. Consequently, the gear-change servo comprises a first hydraulic actuator, mechanically coupled to the control shaft for axial displacement of the control shaft, and a second hydraulic actuator, mechanically coupled to the control shaft for rotating the control shaft.

In the first servos produced, the two hydraulic actuators were both directly coupled to the control shaft and acted on the control shaft independently of one another. However, said constructional solution is cumbersome and costly. For this reason an alternative embodiment has been proposed, in which the first hydraulic actuator is directly coupled to the control shaft for displacing the control shaft axially, whilst the second hydraulic actuator is coupled to a cam engaged by a pin fixed to the control shaft so as to render the cam angularly fixed to a fixed frame. When the cam is angularly fixed to the fixed frame, then the axial displacement of the control shaft forces the control shaft to perform a rotation as a result of the mechanical coupling between the pin and the cam, whereas, when the cam is not angularly fixed to the fixed frame, then the axial displacement of the control shaft brings about a rotation of the cam and not of the control shaft. In servos of the type described above, the second hydraulic actuator acts on a mechanical brake, which is fixed to the fixed frame and is displaced linearly in order to engage an outer surface of a dome, defined in which is the cam.

However, also the constructional solution described above is relatively cumbersome.

DE10033807 discloses a change device for a gear wheel gear change. The change device has a housing, a change shaft, a selection sleeve, brake engagement elements, a brake actuator element and an actuator element; the brake actuating element that is fixed with respect to the selection sleeve is in contact with a concentric radial annular surface of the selection sleeve and the geometric brake axis is coaxial to the central axis of the selection sleeve.

SUMMARY OF THE INVENTION

The aim of the present invention is to provide a servo for a gear change that will be free from the drawbacks described above and, in particular, will be easy and inexpensive to produce and will be very compact.

According to the present invention, a servo is provided for a gear change according to what is recited in the attached claims.

BRIEF DESCRIPTION OF THE DRAWINGS

The present invention will now be described with reference to the annexed plate of drawings, which illustrates a non-limiting example of embodiment thereof, and in which.

DETAILED DESCRIPTION OF THE INVENTION

Figure 1:
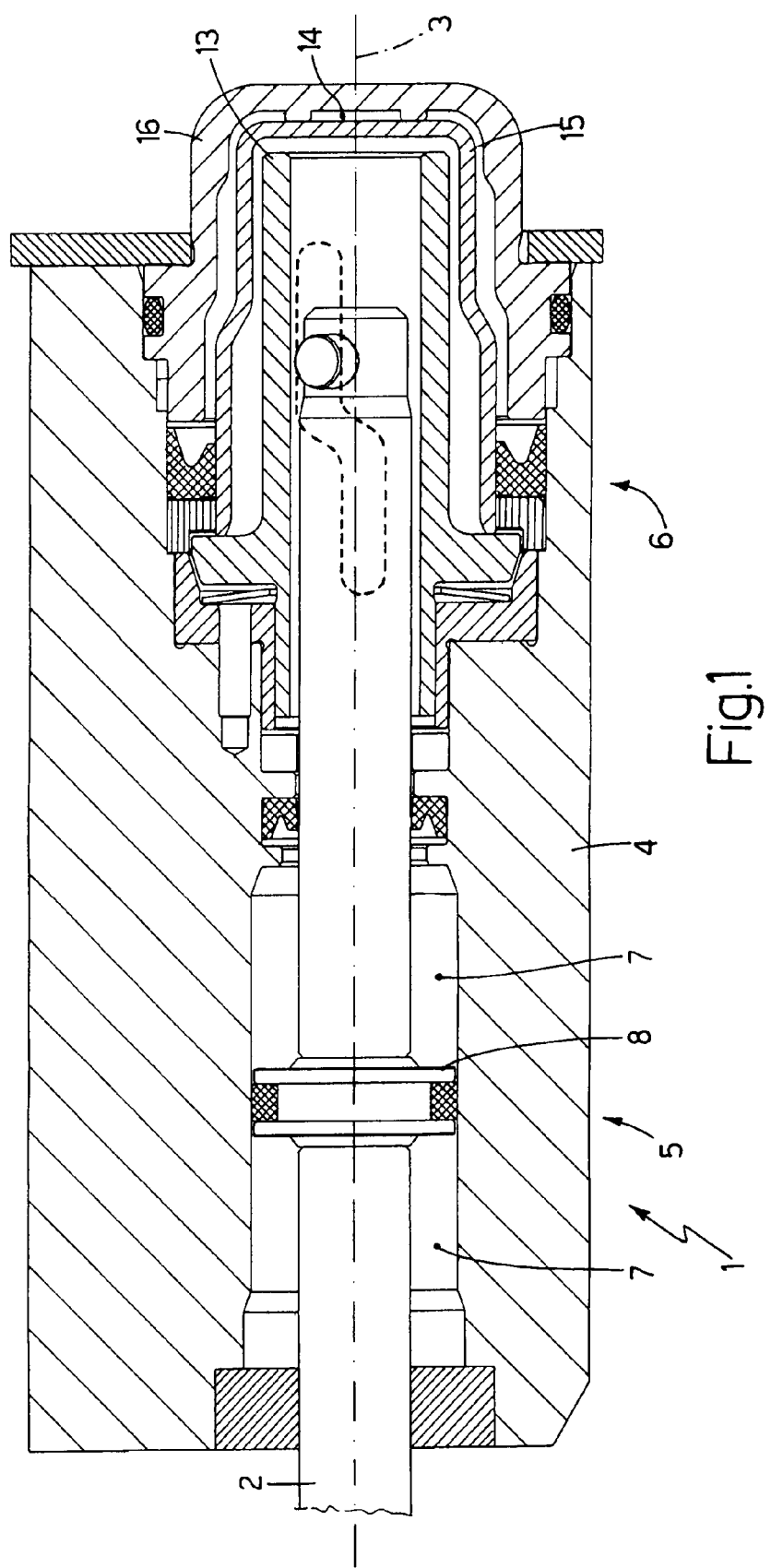
FIG. 1 is a schematic cross-sectional view, with parts removed for reasons of clarity, of a servo built in accordance with the present invention.

In FIG. 1, the reference number 1 designates as a whole a servo for a gear change, which is provided with a control shaft 2. The servo 1 acts on the control shaft 2 of the gear change to impress on the control shaft 2 both an axial displacement, i.e., along a central axis 3, for selecting the range of the gears, and a rotation about the central axis 3, for engaging and disengaging the individual gears. The servo 1 of the gear change comprises a fixed frame 4, which is traversed by the control shaft 2 and supports a first hydraulic actuator 5, mechanically coupled to the control shaft 2 for displacing the control shaft 2 axially, and a second hydraulic actuator 6, mechanically coupled to the control shaft 2 for rotating the control shaft 2 about the central axis 3.

Figure 2:
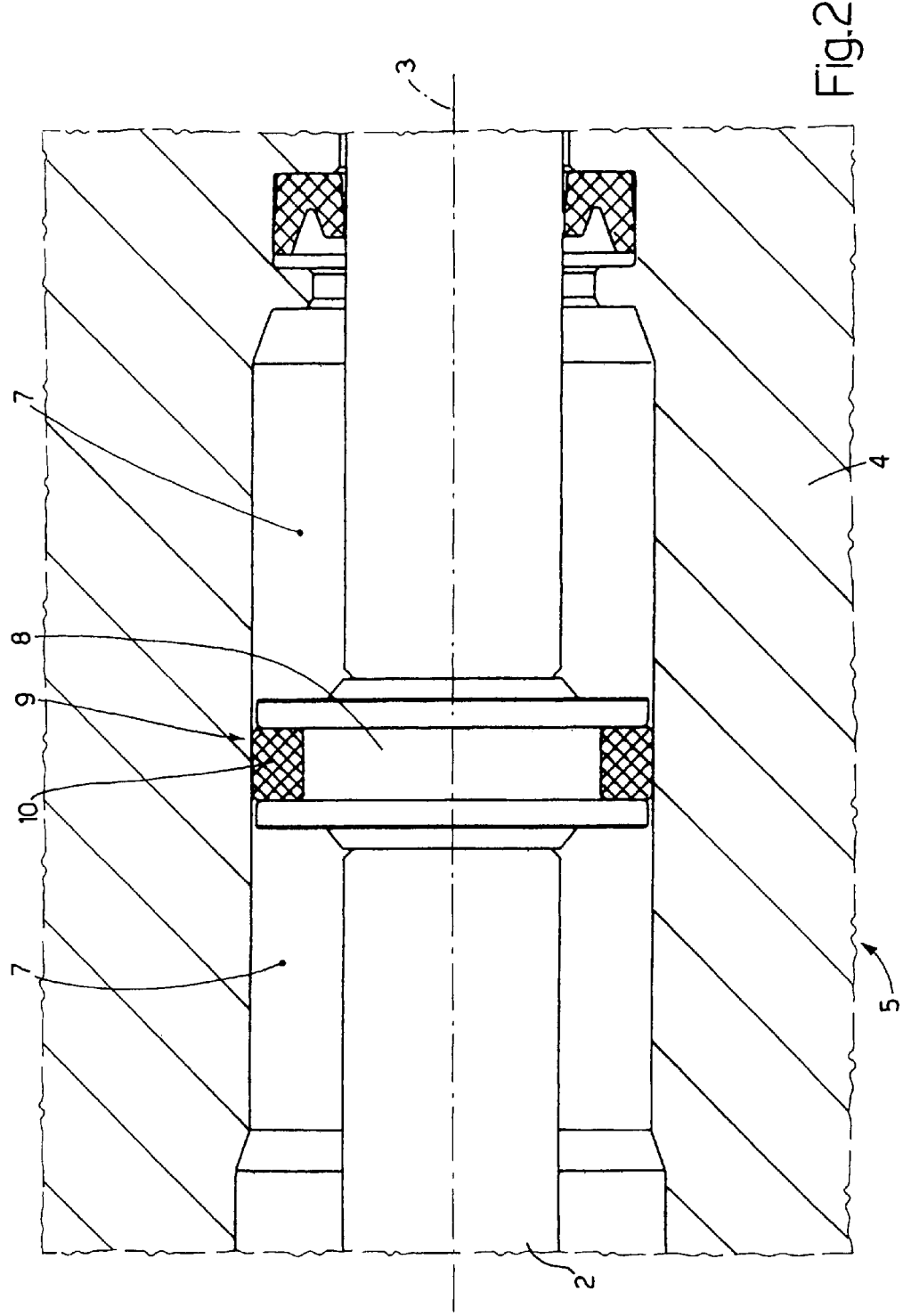
FIG. 2 is a view at an enlarged scale of a first hydraulic actuator of the servo of FIG. 1.

According to what is illustrated in FIG. 2, the first actuator 5 is set in a position corresponding to an intermediate portion of the control shaft 2 and has two chambers 7, which are alternatively filled with a pressurized fluid for displacing the control shaft 2 axially in the two directions under the control of a pair of solenoid valves (not illustrated). In particular, the two chambers 7 are traversed by the control shaft 2, are set in series along the control shaft 2, and are separated from one another by a flange 8, which is fixed to the control shaft 2 and defines a piston of the first hydraulic actuator 5. The flange 8 comprises a central annular cavity 9, which receives an annular seal gasket 10.

Figure 3:
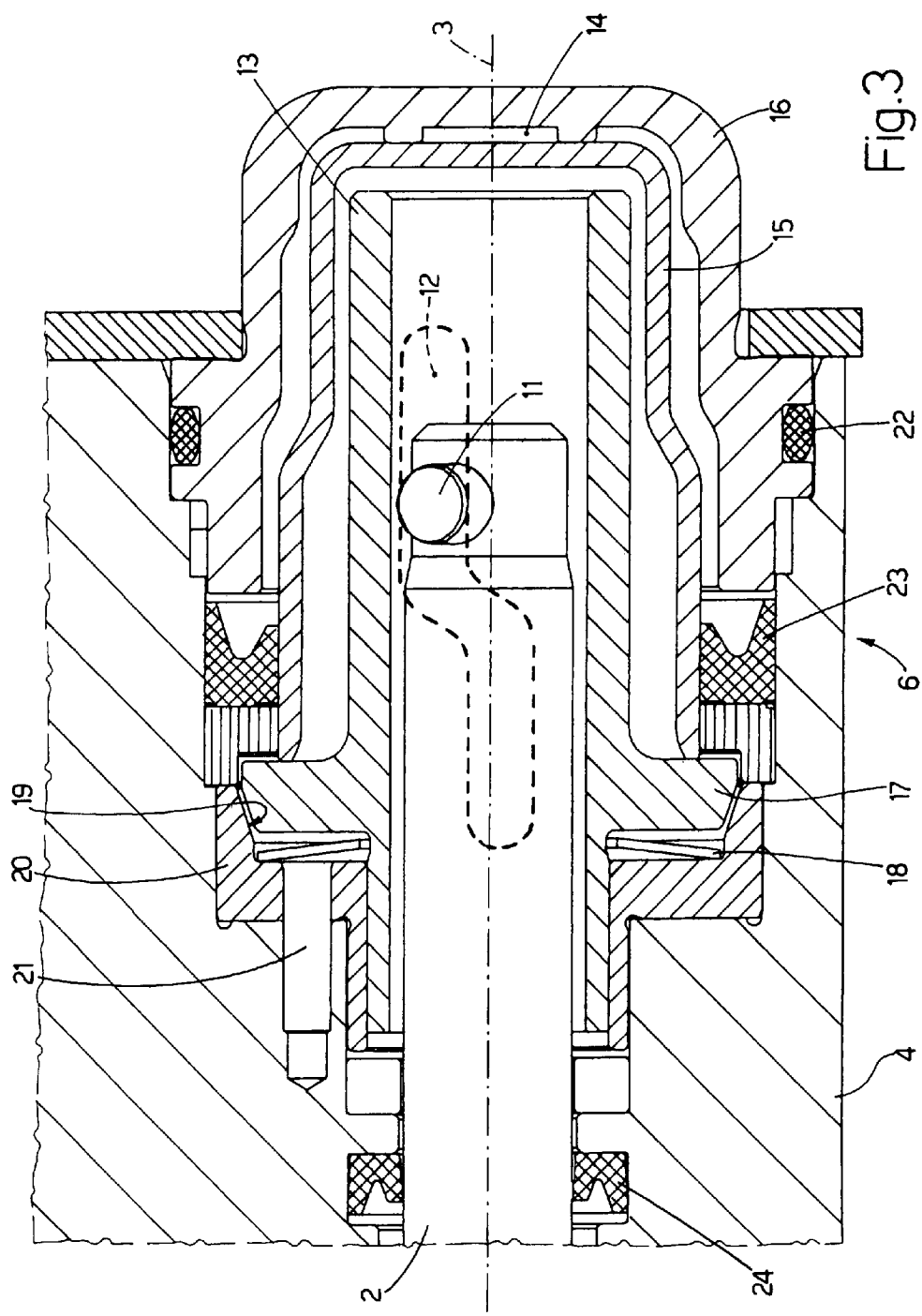
FIG. 3 is a view at an enlarged scale of a second hydraulic actuator of the servo of FIG. 1.

According to what is illustrated in FIG. 3, the second hydraulic actuator 6 is set in a position corresponding to one end of the control shaft 2 provided with a pin 11, which radially projects from the control shaft 2 and engages a cam 12 carried by a cylindrical tubular element 13 coaxial to the control shaft 2. The cam 12, that is the tubular element 13 carrying the cam 12, is normally free to rotate about the central axis 3 without any constraint, and the second hydraulic actuator 6 renders the cam 12, that is the tubular element 13 carrying the cam 12, angularly fixed to the fixed frame 4 to cause rotation of the control shaft 2 about its own central axis 3 during the axial displacement of the control shaft 2. In other words, when the second hydraulic actuator 6 is de-activated, i.e., when the cam 12 is free to rotate with respect to the fixed frame 4, the axial displacement of the control shaft 2 causes a rotation of the cam 12 about the central axis 3, and the control shaft 2 does not perform any rotation about the central axis 3. Instead, when the second hydraulic actuator 6 is activated, i.e., when the cam 12 is angularly fixed to the fixed frame 4, the axial displacement of the control shaft 2 forces the control shaft 2 to rotate about the central axis 3 under the thrust of the cam 12.

The tubular element 13 receives inside it an end portion of the control shaft 2 and is pushed axially by the second actuator 6 against the fixed frame 4 so as to block the tubular element 13 angularly against the fixed frame 4. The second actuator 6 has a chamber 14, which is filled with a pressurized fluid for displacing the tubular element 13 axially under the control of a solenoid valve (not illustrated). The chamber 14 is defined between an internal dome 15, which shares the central axis 3, is axially mobile, partially surrounds the tubular element 13, and rests against the tubular element 13, and an external dome 16, which is fixed to the fixed frame 4, shares the central axis 3 and partially surrounds the internal dome 15.

The tubular element 13 has a flange 17, which on one side constitutes a resting element for the internal dome 15 and on the other side is pressed against the fixed frame 4 so as to render the tubular element 13 angularly fixed to the fixed frame 4. Set between the flange 17 and the fixed frame 4 is an elastic body 18, in particular a Belleville washer, which tends to maintain the flange 17 of the tubular element 13 at a distance from the fixed frame 17. The flange 17 has a conical shape and is pushed by the second hydraulic actuator 6 against a conical seat 19, which has a shape complementary to that of the flange 17 and is carried by the fixed frame 4.

According to a preferred embodiment, the fixed frame 4 is made of a first material and comprises a contrast insert 20, which is made of a second material different from the first material, is set in a position corresponding to the contrast area of the flange 17 of the tubular element 13, and defines the conical seat 19. The contrast insert 20 is made of a second material that affords a high coefficient of friction against the flange 17 of the tubular element 13 to guarantee a high tightening force between the tubular element 13 and the frame 17. In addition, the contrast insert 20 is mechanically connected to the fixed frame 4 by means of a fixing pin 21.

In order to prevent any leakage of the fluid used by the second hydraulic actuator 6, an annular seal gasket 22 set around the external dome 16, an annular seal gasket 23 set around the internal dome 15, and an annular seal gasket 24 set around the control shaft 2 are provided.

The second actuator 6 described above presents numerous advantages, in so far as it is simple, inexpensive and compact and requires the use of just one solenoid valve.

The invention claimed is:

1. A servo (1) for a gear change provided with a control shaft (2); the servo (1) comprising:
   a first actuator (5), which displaces the control shaft (2) axially along a central axis (3) thereof and is directly coupled to the control shaft (2);
   a second actuator (6), which renders a cam (12) engaged by a pin (11) projecting from the control shaft (2) angularly fixed to a fixed frame (4) to cause rotation of the control shaft (2) about its central axis (3) during the axial displacement; and
   a cylindrical tubular element (13), which is coaxial to the control shaft (2), receives inside it an end portion of the control shaft (2), supports the cam (12), and is pushed axially by the second actuator (6) against the fixed frame (4);
   the servo (1) is characterized in that the tubular element (13) has a conical portion that is pushed by the action of the second actuator (6) against a conical seat (19), which has a shape complementary to that of the conical portion of the tubular element (13) and is carried by the fixed frame (4).

2. The servo (1) according to claim 1, wherein the first actuator (5) is a hydraulic actuator and has two first chambers (7), which are alternatively filled with a pressurized fluid for displacing the control shaft (2) axially in the two directions.

3. The servo (1) according to claim 2, wherein: the first actuator (5) is set in a position corresponding to an intermediate portion of the control shaft (2); and the two first chambers (7) are traversed by the control shaft (2), are set in series along the control shaft (2), and are separated from one another by a first flange (8), which is fixed to the control shaft (2) and defines a piston of the first actuator (5).

4. The servo (1) according to claim 1, wherein the second actuator (6) is a hydraulic actuator and has a second chamber (14), which is filled with a pressurized fluid for displacing the tubular element (13) axially.

5. The servo (1) according to claim 4, wherein the tubular element (13) has a second flange (17), which is pressed against the fixed frame (4) so as to render the tubular element (13) angularly fixed to the fixed frame (4).

6. The servo (1) according to claim 5, wherein set between the second flange (17) and the fixed frame (4) is an elastic body (18).

7. The servo (1) according to claim 6, wherein the elastic body (18) is a Belleville washer.

8. The servo (1) according to claim 5, wherein the second flange (17) has a conical shape and is pushed by the second actuator (6) against a conical seat (19), which has a shape complementary to that of the second flange (17) and is carried by the fixed frame (4).

9. The servo (1) according to claim 5, wherein the second chamber (14) is defined between an internal dome (15), which is axially mobile, partially surrounds the tubular element (13), and rests against the second flange (17), and an external dome (16), which is fixed to the fixed frame (4) and partially houses inside it the internal dome (15).

10. The servo (1) according to claim 1, wherein the fixed frame (4) is made of a first material and comprises a contrast insert (20), which is made of a second material different from the first material and is set in a position corresponding to the contrast area of the tubular element (13).

* * * * *